(12) United States Patent
Dettinger et al.

(10) Patent No.: US 7,025,411 B2
(45) Date of Patent: Apr. 11, 2006

(54) SUBASSEMBLY FOR A COCKPIT

(75) Inventors: Mathias Dettinger, Rottweil (DE); Juergen Kilb, Ehningen (DE); Stephan Kramb, Aichwald (DE); Guenter Prieser, Hildrizhausen (DE); Ina Rastetter, Althengstett (DE); Horst Wolbold, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/135,629

(22) Filed: May 20, 2005

(65) Prior Publication Data

US 2006/0028054 A1    Feb. 9, 2006

Related U.S. Application Data

(63) Continuation of application No. PCT/EP03/011522, filed on Oct. 17, 2003.

(30) Foreign Application Priority Data

Nov. 21, 2002  (DE) ................................ 102 54 348

(51) Int. Cl.
    *B60J 7/00*  (2006.01)
(52) U.S. Cl. .................................. 296/193.02; 296/70
(58) Field of Classification Search .......... 296/193.02, 296/193.04, 192, 70, 203.02, 193.09
    See application file for complete search history.

(56) References Cited

U.S. PATENT DOCUMENTS

| 4,717,195 | A | * | 1/1988 | Okuyama et al. | 296/72 |
| D319,614 | S | * | 9/1991 | Slayter | D12/192 |
| 5,324,203 | A | * | 6/1994 | Sano et al. | 296/70 |
| 5,564,515 | A | * | 10/1996 | Schambre | 296/70 |
| D378,585 | S | * | 3/1997 | Duguid et al. | D12/192 |
| 5,676,216 | A | * | 10/1997 | Palma et al. | 296/70 |
| D397,977 | S | * | 9/1998 | Hellhake et al. | D12/192 |
| 5,890,756 | A | * | 4/1999 | Pranger et al. | 296/37.12 |
| 6,129,406 | A | * | 10/2000 | Dauvergne | 296/70 |
| 6,176,534 | B1 | * | 1/2001 | Duncan | 296/70 |
| 6,322,122 | B1 | * | 11/2001 | Burns et al. | 296/70 |
| 6,464,281 | B1 | * | 10/2002 | Volkmann et al. | 296/70 |
| 6,502,888 | B1 | * | 1/2003 | Inoue et al. | 296/70 |
| D489,660 | S | * | 5/2004 | Okumura et al. | D12/192 |
| D499,998 | S | * | 12/2004 | Tanaka et al. | D12/192 |
| 6,843,521 | B1 | * | 1/2005 | Oana | 296/70 |
| 6,872,134 | B1 | * | 3/2005 | Mills | 454/121 |
| 2002/0153760 | A1 | | 10/2002 | Feith et al. | |

FOREIGN PATENT DOCUMENTS

| DE | 196 41 281 A1 | 4/1997 |
| DE | 196 03 957 C2 | 8/1997 |
| DE | 197 20 902 A1 | 11/1998 |
| DE | 199 35 654 A1 | 2/2001 |

(Continued)

*Primary Examiner*—Kiran B. Patel
(74) *Attorney, Agent, or Firm*—Crowell & Moring LLP

(57) ABSTRACT

A structural assembly for a cockpit of a motor vehicle comprising a crossmember which extends over the width of a vehicle interior and is designed as a supporting structure. The crossmember and a dashboard attached thereto are constructed from a driver's module, a central module and a front passenger's module. The modules are designed so that adjacent modules can be fastened to one another, either both indirectly via an adapter part directly. By an appropriate selection (or elimination) of the adapter parts the crossmember and the dashboard can be adapted to different vehicle widths. When assembled, the crossmember and the dashboard form a pre-assembled, self-supporting reinforcement unit which, when installed in the motor vehicle, reinforces the motor vehicle in the transverse direction.

13 Claims, 2 Drawing Sheets

FOREIGN PATENT DOCUMENTS

| | | |
|---|---|---|
| EP | 0 247 296 B1 | 12/1987 |
| EP | 0 672 676 A1 | 9/1995 |
| EP | 1 228 948 A1 | 8/2002 |
| WO | WO 97/13675 | 4/1997 |

* cited by examiner

SUBASSEMBLY FOR A COCKPIT

CROSS REFERENCE TO RELATED APPLICATIONS

This application is a continuation of International Patent Application No. PCT/EP2003/011522, filed Oct. 17, 2003, designating the United States of America, and published in German as WO 2004/045937 A1, the entire disclosure of which is incorporated herein by reference. Priority is claimed based on German Patent Application No. 102 54 348.8, filed Nov. 21, 2002.

BACKGROUND AND SUMMARY OF THE INVENTION

The invention relates to a subassembly for a cockpit of a motor vehicle, having a crossmember which extends over the width of a vehicle interior and is designed as a supporting structure.

German patent document DE 197 20 902 A1 discloses a generic subassembly for a cockpit of a vehicle having a crossmember that extends approximately over the width of a vehicle interior. At its extremities, the crossmember has means for connection to a vehicle cell, and an attachment point which is eccentric to the longitudinal axis of the vehicle for connection to a steering column.

In order to simplify the manufacturing of the cockpit subassembly and to reduce the wide variety of components used, it has been proposed, in the case of the known subassembly, that the crossmember and the attachment points form a constructional unit, and that the outer shape of the crossmember and the attachment points for connection to the passenger cell and for connection to the steering column, be symmetrical to the longitudinal central plane of the crossmember or symmetrical to the geometrical central point of the crossmember. The latter point is situated on a line parallel to the longitudinal axis of the vehicle and vertically above the latter. The longitudinal central plane of the crossmember is the plane which extends vertically and in the direction of the transverse axis of the vehicle and intersects the geometrical central point of the crossmember, which point is situated on a line parallel to the longitudinal axis of the vehicle and vertically above the latter.

German patent document DE 196 03 957 C2 discloses an upper crossmember of a front end part of a vehicle. The upper crossmember is composed of at least two assembly support modules which are arranged one behind the other in the direction of the longitudinal axis of the crossmember and are connected to each other. The assembly support modules are hollow profiles which consist in each case of a light metal extruded profile pressed transversely to the direction of the longitudinal axis of the support, and have a number of reinforcing ribs appropriate for the required stability of the assembly support. The assembly support modules have end regions which permit the modules to be plugged together and/or connected to one another in a clip-like manner or to adjacent hollow profiles.

European patent document EP 0 672 576 B1 discloses a constructional unit for an end wall and cockpit of a passenger vehicle. The end wall is formed as an integral composite component from drawn sheet metal and sprayed-on plastic. For this purpose, a large sheet-metal stamping is formed with relatively little finesse and has a reinforcement integrated in the sheet metal for parts that are subjected to higher loads (such as, for example, the pedal mount and the steering column suspension). The stamped sheet metal is placed into an injection molding die and encapsulated with a thermoplastic by injection molding. This makes it possible for filigree structures of the composite component to be provided for reinforcement, or mounts for add-on parts to be provided, rapidly, in a simple and standard working operation.

European patent document EP 0 247 295 B1 discloses a range of drivers' cabs for cab-over-engine trucks with drivers' cabs of various sizes which can be tipped forward. A body shell of a driver's cab is formed by a rear wall, two side walls, a front wall, a roof assembly and a floor assembly, and is supplemented by a number of standardized functional modules of identical design. The rear wall, the two side walls and the front wall are each formed by single-part sheet-metal stampings and are assembled together with the roof assembly and floor assembly. The standardized front wall is drawn rearward over the entire width at the transition to the roof region to form a roof reinforcement and below the railing line. In the lower drawn-back region, two standardized corner parts that serve as flank protection, a standardized front flap with an open-out mechanism and functional elements that can be covered by the front flap, are fastened in such a manner that wheelhouse parts and wheel covering parts, the parts of the dashboard and an entrance which can be fastened to the chassis frame completely separately from the driver's cab are provided as further standardized functional modules. At exposed points of the driver's cab, shape reinforcement members are provided, at least some of which are designed to take on additional functions.

One object of the present invention is to provide an improved embodiment of a subassembly for a cockpit of a motor vehicle.

Another object of the invention is to increase the flexibility of the production process, and the number of standardized components.

These and other objects and advantages are achieved by the subassembly according to the invention, which has a crossmember designed as a supporting structure and a dashboard, each of which has a driver's module, a central module and a front passenger's module. Adjacent modules can be fastened to one another both indirectly (by means of an adapter part) and directly. This makes it possible for the crossmember and the dashboard to be adapted to different vehicle widths by the use of varying adapter parts and, in particular, by the omission of the adapter parts. Flexibility during the production process is thus enhanced.

The respective crossmember modules and dashboard modules can be combined and assembled to form different driver's cabs depending on requirements. Different driver's cab widths can be realized in a simple manner by installing or omitting various adapter parts. Due to the modular system, each of the various drivers' cabs is composed of the driver's module, the central module and the front passenger's module and, depending on the design width, a number of different adapter parts. As a result, standardized individual components can always be used and the mounting and production costs can therefore be lowered.

At the same time, the crossmember and the dashboard, when assembled, form a pre-assembled, self-supporting reinforcement unit which can be installed in the motor vehicle and, when installed, reinforces the vehicle in the transverse direction. Due to the possibility of pre-manufacturing the individual modules, the production process is simplified and/or accelerated and the sealing problem, as occurs in the region of a lower A-pillar in the case of conventional crossmembers, is removed.

The crossmember may be designed as a tubular supporting framework, an end wall, a self-supporting railing, or a hybrid component with at least one integrated air duct. This arrangement thus offers the advantage of great flexibility and adaptability.

The modular system according to the invention, with the respective modules and/or adapter parts, can be used for different supporting structures, such as, for example, the tubular supporting framework or the self-supporting railing. The functionality of the invention is further enhanced by integration of various add-on parts (for example, the above-mentioned air duct), in the respective modules and/or adapter parts. In this case, the modules and/or the adapter parts expediently have identical interfaces which are mutually compatible, and add-on parts which continue a function, for example air guidance, of the adjacent modules can be added to the adapter parts. As a result, it can be ensured, during the assembly of the crossmember and of the dashboard, that corresponding structures which are integrated into the crossmember are continued with an accurate fit for different drivers' cab widths.

In one particularly favorable embodiment of the invention, the crossmember and/or the adapter parts are of lightweight construction. Hollow profiles or extruded profiles of aluminum and/or plastic and combinations of metallic materials with plastic foamed around them, or of other composite materials are especially suitable in this regard. The power consumption of a motor vehicle is directly associated with the vehicle weight to be moved. By means of an appropriately lightweight construction and incorporation of above-mentioned materials, it is possible to reduce the inherent weight of the vehicle and therefore to save fuel.

It goes without saying that the features mentioned above, and those which have yet to be explained below, can be used not only in the respectively stated combination but also in other combinations or on their own without departing from the framework of the present invention.

Preferred exemplary embodiments of the invention are illustrated in the drawings and are explained in more detail in the description below, with the same reference numbers referring to the same or similar or functionally identical components.

DETAILED DESCRIPTION OF THE DRAWINGS

Figure 1:
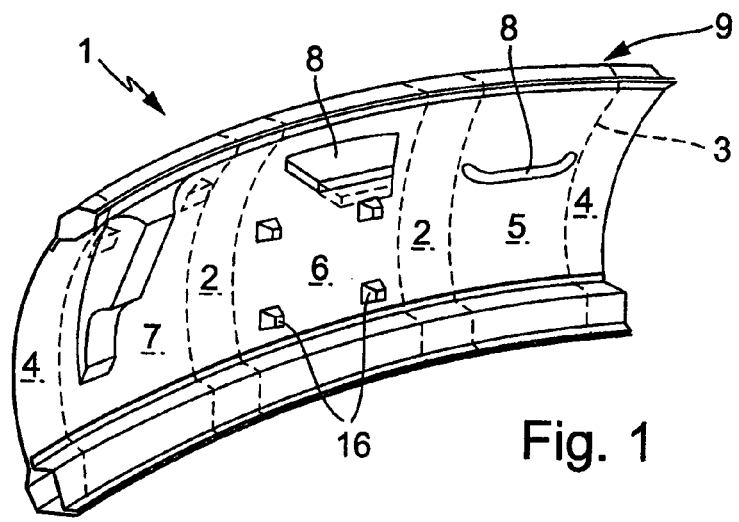
FIG. 1 shows a crossmember according to the invention, designed as an end wall.

According to FIG. 1, a crossmember 9, which is designed as a supporting structure (illustrated here by way of example as an end wall 1), has a plurality of components, namely two lateral adapter parts 4, a driver's module 7, a central module 6, a front passenger's module 5 and two central adapter parts 2 which are arranged between and connect the respective modules 5 and 6, and 6 and 7.

Figure 2:
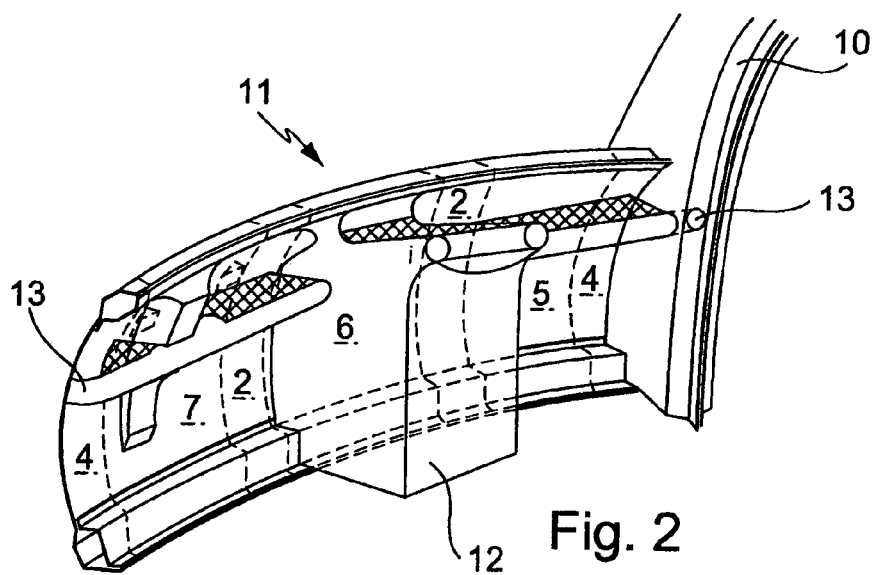
FIG. 2 shows a hybrid support according to the invention.
Figure 3:
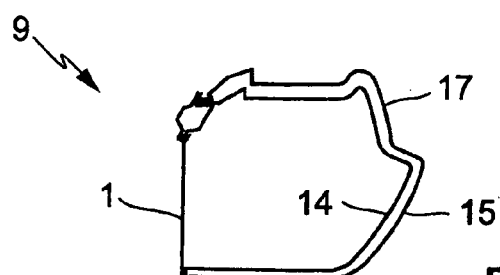
FIG. 3 is a cross sectional view of the hybrid support in FIG. 1.
Figure 4:
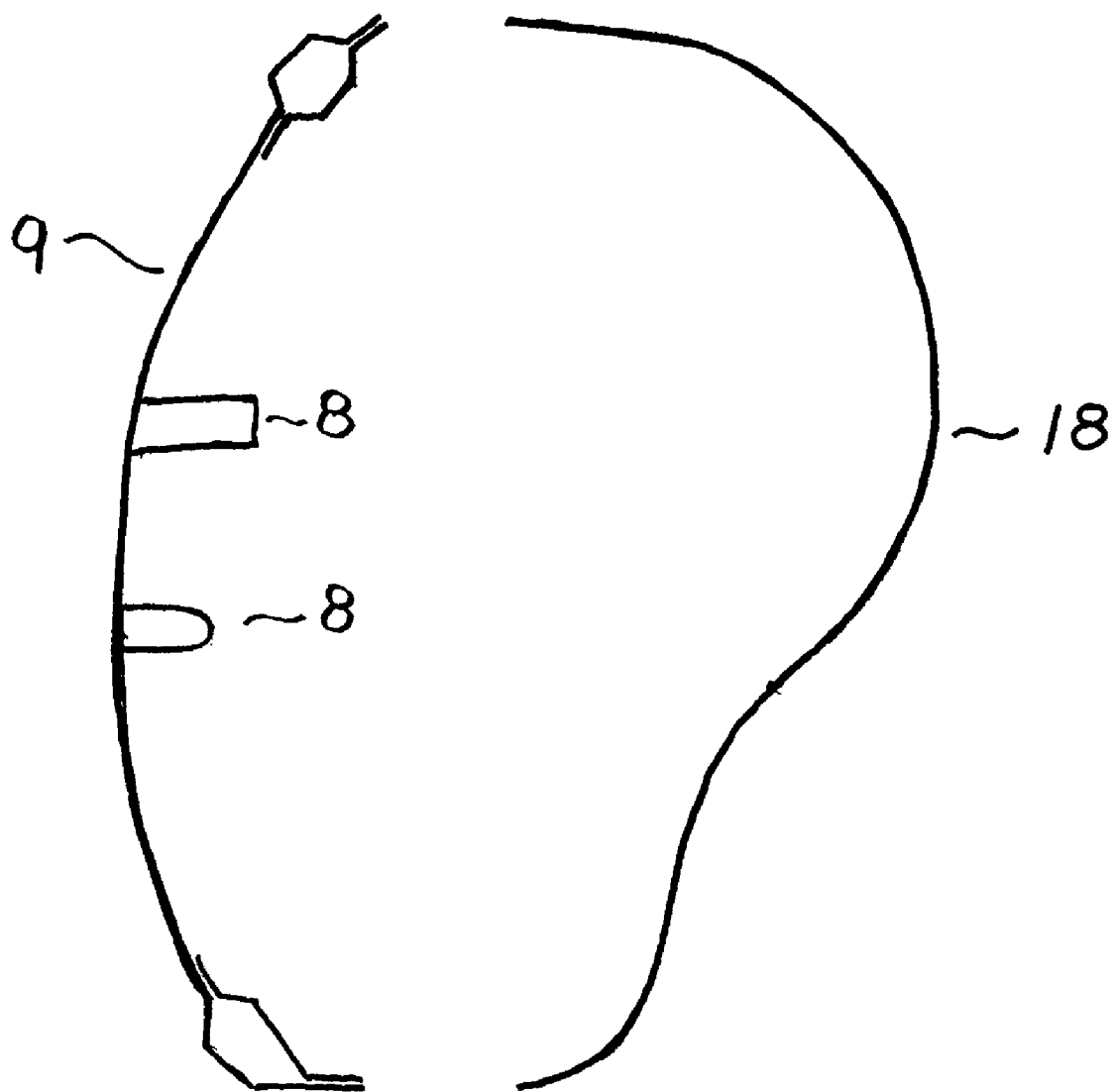
FIG. 4 is an exploded schematic cross sectional depiction of the crossmember according to the invention, with a dashboard.

The crossmember 9 is arranged in a cockpit of a motor vehicle (not shown), and extends over the width of a vehicle interior. In this case, when assembled, the crossmember 9 and a dashboard 18 (shown schematically in FIG. 4) form a pre-assembled and self-supporting reinforcement unit which can be installed in the motor vehicle and, when installed, reinforces the motor vehicle in the transverse direction. The crossmember 9 may be designed as a tubular supporting framework, as a hybrid supporting framework 11 (FIG. 2) or as a self-supporting railing 17 (FIG. 3).

The dashboard can be secured here on holders 8, one of which is arranged by way of example on the front passenger's module 5 or on the central module 6. In addition, screw fastening points 16 are provided on the respective modules 5, 6 and 7 and/or the adapter parts 2, 4, to which points various add-on parts (for example, a central console 12, as shown in FIG. 2 can be fastened.

The individual modules 5, 6 and 7 are designed in such a manner that adjacent modules (5-6 and 6-7) can be fastened to one another in a conventional manner at their respective mutually compatible interfaces 3, either indirectly (by means of the central adapter parts 2) or directly. An appropriate use of the adapter parts 2 and 4 therefore enables different vehicle widths to be realized.

For example, a narrow vehicle width is achieved by direct connection of the modules 5, 6 and 7 without the use of the adapter parts 2 and 4. Medium vehicle widths have at least one central adapter part 2 in each case between the respective modules 5-6 and 6-7, whereas even wider vehicles are realized by joining the lateral adapter parts 4 to the front passenger's module 5 and the driver's module 7. In principle, a construction of the crossmember 9 from the respective modules 5, 6 and 7 and the two lateral adapter parts 4 without the use of the central adapter parts 2 is also conceivable.

The possibility of pre-manufacturing components or component assemblies (and the lower stockkeeping requirement associated therewith) and the modular construction of the crossmember 9 from the respective modules 5, 6 and 7 and in addition the adapter parts 2 and 4, affords substantial flexibility during the production process, achieving valuable advantages in production and costs.

The interfaces 3 on the adapter parts 2 and 4 and the respective modules 5, 6 and 7 are in each case of identical design or of mutually compatible design.

As illustrated in FIG. 1, the adapter parts 2 and 4 reach over the entire height of the individual modules 5, 6 and 7 and therefore also over the entire height of the crossmember 9. At the same time, the adapter parts 2 and 4 are designed in such a manner that they continue the shape and contour and also a certain function, such as, for example, an air duct 13. (See FIG. 2.)

In FIG. 2, the crossmember 9 is designed as a hybrid support 11. In this case, a number of functions are realized, namely the reinforcement of the vehicle in the transverse direction and the integration of functional components (such as, for example, the air duct 13) into the supporting structure. The air duct 13 runs parallel to the longitudinal direction of the hybrid support 11 and is designed by way of example in FIG. 2 in such a manner that air is guided by a side A-pillar 10 into a side vehicle door (not shown). For the sake of clarity, FIG. 2 shows only one air duct 13; the integration of further air ducts 13 or other functional components, for example a cable duct, into the hybrid support 11, however, are also possible.

FIG. 3 shows a crossmember 9 which is designed as a self-supporting railing and has a dashboard (not explained in more detail) arranged thereon. A construction of the self-supporting railing 17 that is possible in principle is to be explained here. By way of example, the railing 17 has a plate 14 situated on the inside and a plastic casing 15 resting flat against it. The plastic casing 15 may be designed as plastic sheeting or as synthetic foam whereas the supporting structure (plate 14) may also be formed from an easily shapeable, curable plastic, such as, for example, glass fiber reinforced plastic and, as a result, helps to save weight and associated energy costs. The production of complex shapes from glass fiber reinforced plastic is simpler to realize.

In summary, the features of the solution according to the invention can be characterized as follows:

A crossmember 9 designed as a supporting structure has a plurality of components, namely a driver's module 7, a central module 6, a front passenger's module 5 and, depending on the vehicle width required, in addition two lateral adapter parts 4 and/or two or more central adapter parts 2 in each case connecting the individual modules 5, 6 and 7. The individual modules 5, 6 and 7 are designed in such a manner that adjacent modules (5-6 and 6-7) can be fastened to one another at their respective interfaces 3, in each case both indirectly by means of adapter parts 2, and also directly, as a result of which different vehicle widths are realized.

The modular construction of the crossmember 9 from the respective modules 5, 6 and 7 and in addition the adapter parts 2 and/or 4 affords advantages with regard to manufacturing flexibility, the possibility of pre-manufacturing and an associated lower stockkeeping requirement.

Holders 8 and fastening points 16, to which various add-on parts, such as, for example, the central console 12, can be fastened, are provided on the modules 5, 6 and 7 and/or the adapter parts 2 and 4. The interfaces 3 on the adapter parts 2 and 4 and the respective modules 5, 6 and 7 are in each case of identical design and are mutually compatible. The adapter parts 2 and 4 reach over the entire height of the individual modules 5, 6 and 7 and are designed in such a manner that they continue the shape and contour and certain functions, such as, for example, the air duct 13.

The crossmember 9 can be designed as a tubular supporting framework, as a hybrid supporting framework 11 or as a self-supporting railing 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A structural assembly for a cockpit of a motor vehicle, comprising a crossmember which extends over the width of a vehicle interior and forms a supporting structure, and a dashboard, the crossmember and the dashboard being constructed from a driver's module, a central module and a front passenger's module, wherein:
   the modules are adapted to be fastened to one another, either indirectly, by means of an adapter part or directly whereby the crossmember are adjustable to different vehicle widths; and
   the crossmember and the dashboard, when assembled, form a pre-assembled, self-supporting reinforcement unit which, when installed in a motor vehicle, forms a structural reinforcing member which reinforces the motor vehicle in the transverse direction.

2. The structural assembly as claimed in claim 1, wherein the crossmember comprises one of a tubular supporting framework, an end wall and a self-supporting railing.

3. The structural assembly as claimed in claim 1, wherein the crossmember is a hybrid component which includes at least one integrated air duct.

4. The structural assembly as claimed in claim 1, wherein means for holding add on parts are arranged on at least one of the driver's module, the central module, the front passenger's module and the adapter parts.

5. The structural assembly as claimed in claim 4, wherein at least one of the modules and the adapter parts is of lightweight construction.

6. The structural assembly as claimed in claim 4, wherein the adapter parts extend over the entire height of the crossmember.

7. The structural assembly as claimed in claim 6, wherein the adapter parts and the modules have, for their fastening to one another, in each case mutually compatibly designed interfaces.

8. The structural assembly as claimed in claim 7, wherein the adapter parts include means for continuing a function of adjacent modules.

9. The structural assembly as claimed in claim 7, wherein add-on parts that continue a function of adjacent modules can be added to the adapter parts.

10. A structural assembly for a passenger compartment of a motor vehicle, comprising:
   a driver's side module;
   a central module;
   a passenger side module, extremities of said driver's side, central and passenger side modules being formed with compatibly designed interfaces by which said modules can be coupled to form a structural reinforcing crossmember for said passenger compartment; wherein,
   first adapter parts are insertable between consecutive modules in said structural crossmember, said first adapter parts also having compatibly designed interfaces at their extremities for coupling said modules together to form said structural reinforcing crossmember, whereby said structural reinforcing crossmember can be formed with an adjustable width which is adaptable to a width of said passenger compartment.

11. The structural assembly according to claim 10, wherein:
   second adapter parts, having compatibly designed interfaces, are attachable at extremities of said structural reinforcing crossmember, whereby the width of said structural reinforcing crossmember can be further adjusted.

12. The structural assembly according to claim 11, wherein at least one of said modules and said adapter parts includes means for assembly of said structural reinforcing crossmember with a dashboard to form a preassembled, self-supporting dashboard assembly which, when installed in said passenger compartment, reinforces the motor vehicle in the transverse direction.

13. The structural assembly according to claim 12, wherein said dashboard is of modular construction.

* * * * *